3,330,860
THE USE OF ISONITRILE CHROMIUM PENTA-
CARBONYL COMPOUNDS IN THE PREPARA-
TION OF ESTERS
Raymond E. Maginn, Columbus, Ohio, assignor to Ethyl
Corporation, New York, N.Y., a corporation of Virginia
No Drawing. Filed May 8, 1963, Ser. No. 278,986
7 Claims. (Cl. 260—476)

This application is a continuation-in-part of Ser. No. 183,395, filed Mar. 29, 1962, now U.S. Patent No. 3,136,797.

This invention relates to a novel process for the preparation of esters.

It is an object of this invention to provide a process for the preparation of esters which comprises reacting an alcohol with a non-acidic compound. A further object is to provide a process for the preparation of esters from chromium carbonyl compounds. Another object is to provide an ester synthesis comprising the reaction of an alcohol with an isonitrile chromium pentacarbonyl. Additional objects will be apparent from the following specification and claims.

The objects of this invention are accomplished by providing a process for the preparation of esters which comprises reacting an alcohol with an acyl isonitrile chromium pentacarbonyl having the formula

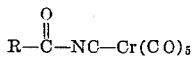

wherein R is a radical having from 1 to about 16 carbon atoms, preferably alkyl, cycloalkyl, aralkyl, aryl, alkaryl, alkenyl and cycloalkenyl radicals.

The isonitrile chromium pentacarbonyl compounds employed in this process are disclosed in my copending application, Ser. No. 183,395, filed Mar. 29, 1962, now U.S. Patent No. 3, 136,797. The contents of that disclosure are incorporated by reference herein as if fully set forth.

The radical R in the above formula can be selected from a wide variety of organic radicals; that is, they are composed solely of carbon and hydrogen.

Compounds which contain other groups attached to the carbon chain of the radical R are applicable. Hence, compounds such as chloropropionyl isonitrile chromium pentacarbonyl, p-aminobenzoyl isonitrile chromium pentacarbonyl, m-nitrobenzoyl isonitrile chromium pentacarbonyl and 5-hydroxyvaleryl isonitrile chromium pentacarbonyl are applicable in the invention.

The radical R in the above formula may be an alkyl radical having either a straight or branched chain. Non-limiting examples of this type of radical are the methyl, ethyl, isopropyl, amyl and 3-hexadecyl radicals. Similarly, R may be an alkenyl radical such as the isopropenyl and 4-hexenyl radicals. R may contain two or more olefinic bonds. Radicals containing two olefinic bonds are the 1,3-pentadienyl radical and the like. R may contain one or more triple bonds.

R may be an alicyclic radical. Thus, for example, R may be a cyclohexyl or cyclopentyl radical. The alicyclic radical may contain olefinic bonds. Illustrative radicals of this type are the cyclopentenyl and 1,3-cyclohexadienyl radicals.

Furthermore, the cyclic radicals described and illustrated above may be substituted by aliphatic or aromatic substituents. Aralkyl radicals such as the phenylcyclohexenyl radicals and phenylcyclohexyl radicals are non-limiting examples of this type. Non-limiting examples of alkyl substituted alicyclic radicals are the ethylcyclohexyl, dimethylcyclohexyl and 1-methyl-3-cyclohexyl radicals.

Aralkyl radicals such as the β-phenylethyl and β-phenylbutyl radicals are also applicable.

R may also be a univalent aromatic radical. Non-limiting examples of applicable aromatic radicals are the phenyl, biphenylyl, naphthyl, 2,3-xylyl, and p-cumenyl radicals.

The exact structural configuration of the radical R is not critical. No limitation as to size or complexity of the radical has been found. However, the preferred radicals have one to about 16 carbon atoms. The most preferred radicals are those selected from the class consisting of alkyl, cycloalkyl, aralkyl, aryl, alkaryl, alkenyl, and cycloalkenyl radicals. Compounds incorporating these radicals are preferred since they are more easily prepared and/or many of the esters produced by reacting these compounds with an alcohol have greater commercial utility.

Any alcohol having a reactive hydroxyl group is applicable in this process. It is preferred that the alcohol have from one to about 18 carbon atoms. Preferred alcohols have a hydrocarbon radical selected from the class consisting of alkyl, cycloalkyl, aralkyl, aryl, alkaryl, alkenyl and cycloalkenyl radicals bonded to the hydroxy radical. Compounds containing a hydroxy radical bonded to an aromatic radical are commonly referred to as phenols. Typical applicable alcohols are methyl alcohol, ethyl alcohol, isopropyl alcohol, allyl alcohol, sec-butyl alcohol, t-butyl alcohol, t-amyl alcohol, cyclohexanol, capryl alcohol (octanol-2), lauryl alcohol, cetyl alcohol, stearyl alcohol, benzyl alcohol, phenol, o-cresol, m-cresol, p-cresol, 3-cyclohexenol, and the like.

Polyhydric alcohols such as ethyleneglycol, dihydroxyacetone, glycerol, pentaerythritol and the like are also applicable.

The process conditions are not particularly critical since the reactants need only be brought together at reaction temperatures. Agitation of the reaction mixture is helpful and the reaction may be carried out in an inert atmosphere or in air if desired. In many instances the isonitrile chromium pentacarbonyl is sufficiently soluble in the alcohol reactant to enable the process to be carried out in a single liquid phase system. More than an equivalent quantity of alcohol can be employed if necessary to completely solubilize the isonitrile compound. Molar excesses of the alcohol reactant of from two to 100 or even higher can be employed. Frequently, an excess of alcoholic reactant not only serves as a solvent, but by the Law of Mass Action, serves to force the reaction to afford higher yields of product.

In general, any non-reactive solvent can be used although in many cases a solvent is not necessary. Organic solvents are preferred. Typical inert solvents which may be employed are aliphatic hydrocarbons such as isooctane, nonane and the like, and hydrocarbon mixtures such as No. 9 oil and kerosene. Chlorinated solvents such as chloroform, carbon tetrachloride, trichloroethylene and the like can be employed if desired.

The process of this invention is effectively carried out at atmospheric pressure; however, in some instances, pressure as low as 10 mm. Hg or as high as 500 atmospheres can be employed if desired.

The process is usually carried out at a temperature within the range of from 15 to 200° C. Higher or lower temperatures can be employed if desired. It is preferred that the temperature be sufficiently high to afford a reasonable rate of reaction, but not so high as to destroy the products or the reactants. The preferred temperature range is 25° to 100° C.

The time required is not a true independent variable but is dependent upon the other process variables employed. Generally, when high temperatures and agitation are employed, there will be a proportionate decrease in the reaction time. When the process of this invention is followed as illustrated by the above discussion and the following examples, reaction times in the order of one to 48 hours usually yield satisfactory results. The preferred reaction time is in the range of 5 to 10 hours. However, if it is desired, higher yields of products can be obtained in some instances if the reaction time is extended to from about 5 to about 10 days.

The products of the process of this invention can be readily separated from the reaction mixture by techniques familiar to a skilled practitioner. Applicable techniques include distillation, extraction, crystallization, chromatography and the like.

In the following examples, all parts are parts by weight unless otherwise noted.

Example I

A solution comprising 1.62 grams of benzoyl isonitrile chromium pentacarbonyl (chromium-pentacarbonyl benzoyl-$\binom{C}{N}$)

in 75 mls. of methanol was refluxed for 5 hours under nitrogen. The solvent was removed from the clear green-yellow solution under reduced pressure, leaving a brownish-red oily residue. The residue was evaporatively distilled overnight, yielding 0.32 gram of a clear liquid having a sweet ester-like odor. The infrared spectrum of this liquid was identical to that of pure methyl benzoate prepared by an independent route.

Example II

One mole of isobutyryl isonitrile chromium pentacarbonyl is reacted at 100° C. with 10 moles n-butyl alcohol for two hours. Excess n-butyl alcohol is removed from the reaction mixture by distillation. The residue is chromatographed on alumina and the product, n-butyl isobutyrate, is eluted from the column.

Example III

Phenylacetyl isonitrile chromium pentacarbonyl, one mole, and 5 moles of isobutyl alcohol are reacted according to the procedure of Example I. The product is isobutyl phenylacetate, having a boiling point at about 247° C.

Example IV

A chloroform solution of 2-naphthol and benzoylisonitrile chromium pentacarbonyl are reacted at 50° C. for 10 hours. The product is 2-naphthyl benzoate, M.P. 107° C.

Example V

One mole of cinnamoyl isonitrile chromium pentacarbonyl and one-tenth mole of phenol are dissolved in a nonane-chloroform mixture (1:1) and allowed to react at room temperature for 48 hours. The product, phenyl cinnamate, is obtained from the reaction mixture by fractional crystallization and purified by chromatographing on alumina to yield a fraction melting at about 72° C.

Example VI

A one-hundred-fold excess of ethanol is reacted with palmitoyl isonitrile chromium pentacarbonyl by refluxing the mixture for two hours to yield ethyl palmitate which is a low melting solid having a boiling point about 185° C.

The product, ethyl palmitate, is separated from the reaction mixture by distillation.

Example VII

Molar equivalent quantities of benzyl alcohol and isobutyryl isonitrile chromium pentacarbonyl dissolved in chloroform are reacted at 50° C. for two days. The product, benzyl isobutyrate, is separated from the reaction mixture by distillation.

Example VIII

Three moles of allyl alcohol and 0.1 mole of benzoyl isonitrile chromium pentacarbonyl are reacted by heating to 200° C. for one-half hour. The product, allyl benzoate, is separated by distillation and purified by chromatography.

Other examples of the process of this invention include the reaction of cyclohexylacetyl isonitrile chromium pentacarbonyl with ethanol to yield ethyl cyclohexylacetate; the reaction of 2-cyclohexenylacetyl isonitrile chromium pentacarbonyl with cyclohexanol to yield cyclohexyl 2-cyclohexenylacetate; the reaction of biphenyloyl isonitrile chromium pentacarbonyl with phenol to yield phenyl p-phenylbenzoate; and the reaction of 1,3,5-triethylbenzoyl isonitrile chromium pentacarbonyl with p-cresol to yield p-cresyl 1,3,5-triethylbenzoate. Similarly, 2,2,4-tripropylvaleryl isonitrile chromium pentacarbonyl reacts with benzyl alcohol to yield benzyl 2,2,4 - tripropylvalerate; isobutyryl isonitrile chromium pentacarbonyl reacts with allyl alcohol to yield allyl isobutyrate and benzoyl isonitrile chromium pentacarbonyl reacts with 3-cyclohexen-ol to yield 3-cyclohexenyl benzoate. Another example of the process of this invention is the reaction of benzoyl isonitrile chromium pentacarbonyl with stearyl alcohol to yield stearyl benzoate. Similarly, glycerol reacts with benzoyl isonitrile chromium pentacarbonyl to yield glyceryl tribenzoate, and ethyleneglycol reacts with isobutyryl isonitrile chromium pentacarbonyl to yield glycyl diisobutyrate.

The above examples illustrate the process of this invention but do not limit it.

The esters produced by this invention have many utilities. Some of them are solvents and others are incorporated in flavor and perfume compositions. Other esters produced by this invention are useful in wax formulations and some are useful as plasticizers. The esters can be employed as chemical intermediates. For example, they may be hydrolyzed to obtain the corresponding acids.

Having fully defined the novel process of this invention and the utilities of the products produced thereby, it is desired that the invention be limited only within the lawful scope of the appended claims.

I claim:

1. Process for the preparation of an ester, said process comprising reacting a monohydric hydrocarbyl alcohol having 1 to 18 carbon atoms wherein the hydrocarbyl portion is selected from the class consisting of alkyl, cycloalkyl, aralkyl, aryl, alkaryl, alkenyl and cycloalkenyl radicals, with an acyl isonitrile chromium pentacarbonyl having the formula

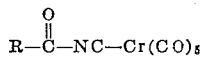

wherein R is a hydrocarbon radical having from 1 to about 16 carbon atoms, said radical selected from the class consisting of alkyl, cycloalkyl, aralkyl, aryl, alkaryl, alkenyl and cycloalkenyl radicals.

2. The process of claim 1 being carried out at a temperature within the range of from 15° to 200° C.

3. The process of claim 2 being carried out in the presence of an excess of said alcohol.

4. The process of claim 3 wherein said acyl nitrile chromium pentacarbonyl is benzoyl isonitrile chromium pentacarbonyl.

5. The process of claim 3 wherein said acyl isonitrile chromium pentacarbonyl is isobutyryl isonitrile chromium pentacarbonyl.

6. Process for the preparation of methylbenzoate, said process comprising reacting methanol with benzoyl isonitrile chromium pentacarbonyl.

7. The process of claim 6 wherein an excess of methanol is employed.

No references cited.

LORRAINE A. WEINBERGER, *Primary Examiner.*

THOMAS L. GALLOWAY, Jr., *Assistant Examiner.*